INVENTOR.
William L. Ostendorf
by Christy, Parmelee and Strickland
his attorneys Patented May 1, 1951

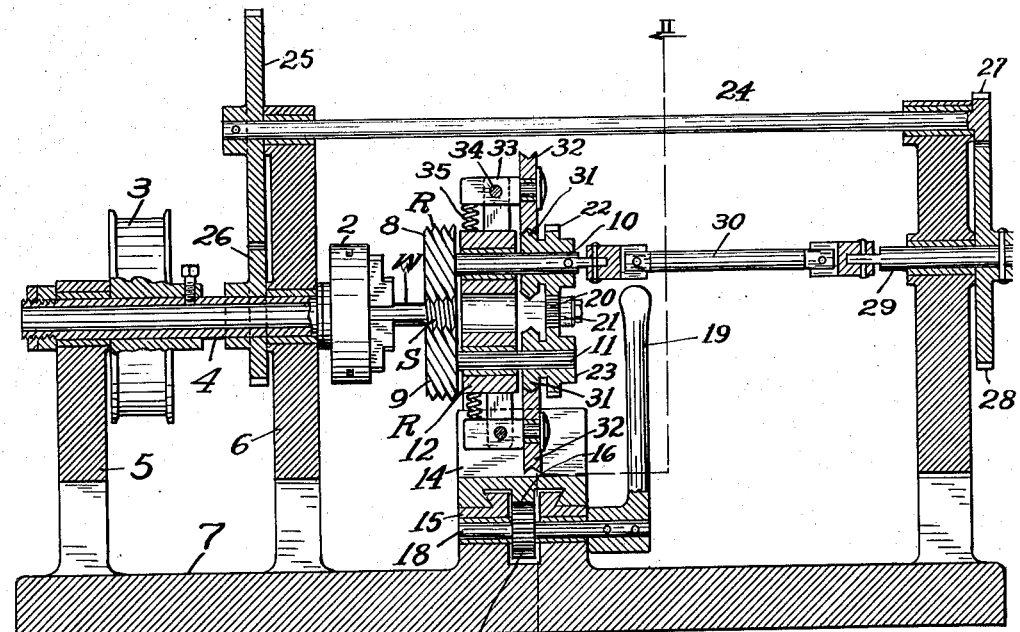
Fig. 1.
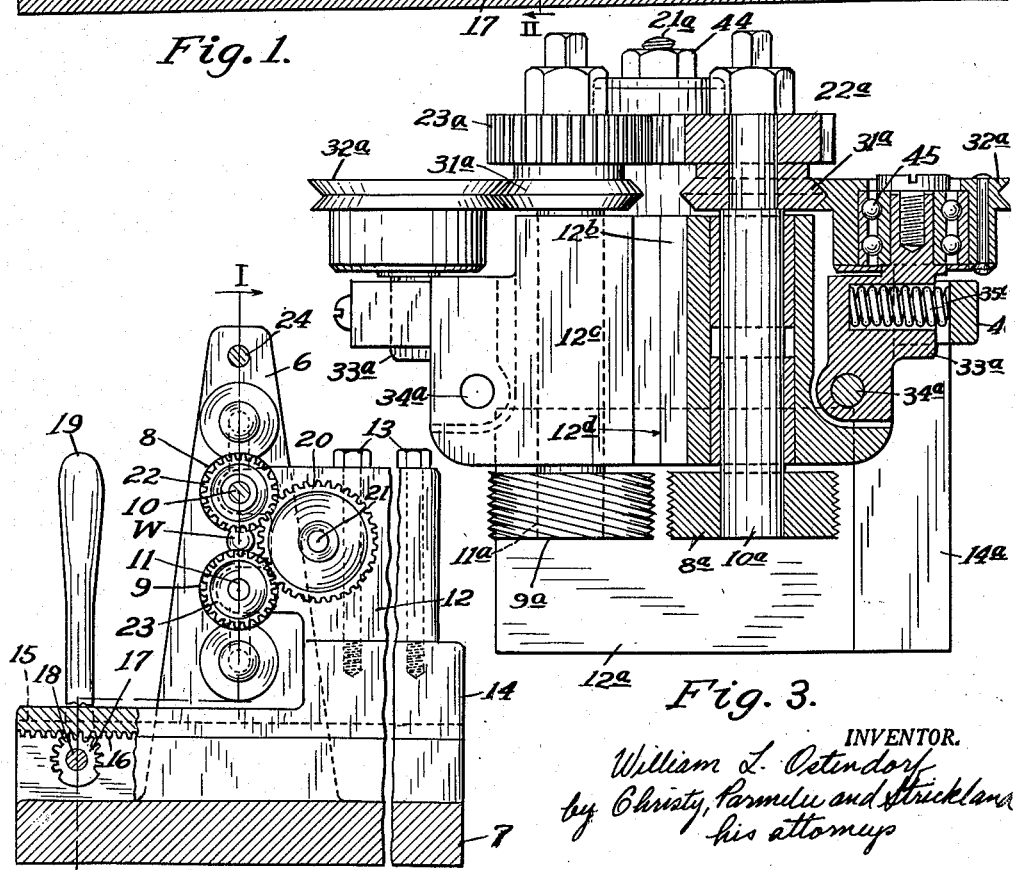
Fig. 2.
Fig. 3.
INVENTOR.
William L. Ostendorf
by Christy, Parmelee and Strickland
his attorneys May 1, 1951 W. L. OSTENDORF 2,550,855
THREAD ROLLING APPARATUS
Filed March 26, 1947 3 Sheets-Sheet 3

2,550,855

UNITED STATES PATENT OFFICE 2,550,855

THREAD ROLLING APPARATUS

William L. Ostendorf, Pittsburgh, Pa., assignor of one-half to Raymond P. Suess, Pittsburgh, Pa.

Application March 26, 1947, Serial No. 737,293

5 Claims. (Cl. 80—6)

My invention relates to the production of screw threads upon the shanks of bolts, screws and other screw-threaded products, and the invention consists in certain new and useful improvements in apparatus for forming screw threads through the instrumentality of rotary dies or rolls.

The art has long had knowledge of thread-forming tools that include cylindrical rolls which are adapted, upon being forced against the cylindrical shank of a rotating work-piece, to impress a screw thread in the substance of the shank. The metal at and immediately within the surface of the shank is fashioned into the exact form of the thread-forming grooves and ridges in the work faces of the rolls. A great measure of success has been achieved by several manufacturers of machines that were especially designed and constructed for such threading operations, but these machines require previous preparation of the blank, thus entailing extra labor and manufacturing costs.

An object of my invention is to provide a thread-rolling apparatus that is perfectly applicable as an attachment for automatic screw machines, lathes and other machines of multiple purpose, and in so doing to minimize or eliminate the special treatment of the work-pieces preparatory to the operation.

More particularly, I aim to provide a thread-rolling unit which may, for example, be mounted on the side tool slides of automatic screw machines, which slides usually move to and from the work-piece laterally, in a direction extending at an angle of ninety degrees to the center line of the work-piece. The unit preferably, though not always necessarily, includes two rolls mounted in spaced relation with the work faces of the rolls extending in opposition to receive the body of a work-piece between them. The two rolls are geared together for rotation in unison, and, as will presently appear, the rolls may be positively driven, or may be rotated solely by the engagement of the rotated work-piece therewith, in the latter case sufficient friction being developed between the rotated work-piece and the rolls to do the job.

It has been noted that a variable amount of slippage takes place between the work-piece and the roll surfaces, the amount of slippage depending mainly upon the frictional properties of the material of which the work-piece is formed, and upon the speed of work-piece rotation. Compensation for this slippage may be made by forming the rolls smaller in diameter than the theoretical correct size, but this compensation is only approximate, since other variable influencing factors are involved. One formula for determining a suitable approximation of correct roll size is:

$$(P-.430p) \times N = D$$

where P is the pitch diameter of the thread to be formed, $p$ is the pitch of the thread, N is the number of threads or thread starts on the rolls, and D is the outside diameter of the rolls.

The rolls are mounted in the thread-forming unit in such manner as to provide for a small axial movement of the rolls during a thread-forming operation. This axial movement of the rolls is due to the varying amount of slippage referred to, and to the rolls following the helix angle of the thread being formed during the interval in which the roll-carrying unit moves the rolls laterally of the work-piece from the point where initial contact of the rolls with the surface of the work-piece is made to the point where the helical ridges on the rolls are fully embedded in the substance of the work-piece, the work-piece being secured against all but rotary movement. The unit of this invention provides for the ready axial movement of either roll to one side or the other of the normal axial position of the roll at the time initial contact is made with the surface of the work-piece. The unit of the invention, furthermore, includes means for accurately restoring each axially displaced roll to its normal or thread-starting position at the end of each thread-forming operation.

It may be remarked that, if the threading rolls were of exactly the proper diameter for a work-piece of given size, and if there was no slippage between the rolls and the work-piece, there would be no need for axial movement of the rolls. But these conditions are seldom, if ever, encountered in practice. I have found that under certain circumstances a roll requires axial movement to one side of its thread-starting position in order to produce perfect threads, while under other circumstances the roll requires axial movement to the opposite side of said starting position. My invention is based not only upon this discovery, but in the conception of means which provide for the required substantially unrestrained axial movement of a thread-forming roll to either side of its starting position, together with an improved instrumentality for positively and accurately restoring the roll to said starting position.

While the invention has been developed particularly for application to automatic screw machines and other multiple operation machines, it also may be used to advantage in machines primarily designed for threading operations.

Having outlined the general nature of my invention, reference is now made to the accompanying drawings, in which an exemplary embodiment of the invention is illustrated:

Fig. 1 is a longitudinal, vertical, sectional view of a simplified form of threading machine, in which a thread-rolling apparatus of the invention is incorporated;

Fig. 2 is a transverse sectional view of the machine, as seen on the vertical planes indicated at II—II of Fig. 1. The body of the machine is shown broken away adjacent to the right-hand side of the view for convenience in illusration, and the planes of section, on which Fig. 1 is shown, appear at I—I in this view;

Fig. 3 is a view to larger scale of a thread-rolling apparatus or unit of the invention which is more refined in structural detail than the apparatus incorporated in the machine of Fig. 1. Fig. 3 shows the unit partly in end elevation and partly in section, on the plane denoted at III—III in Fig. 4;

Figure 4:
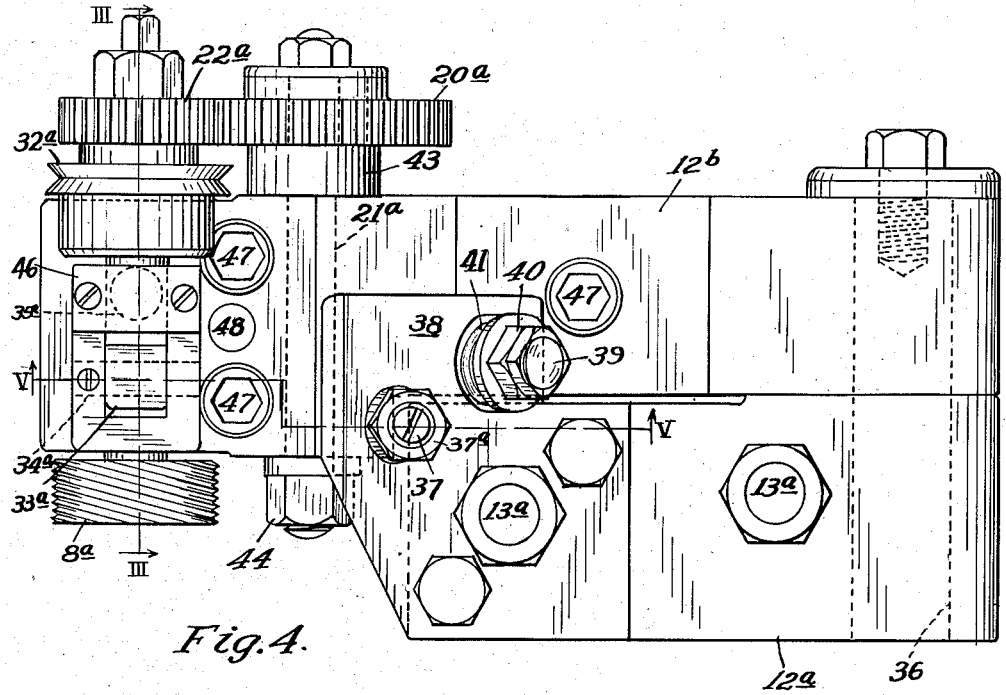
Fig. 4 is a view of the unit, as seen in plan from above.

Referring to Figs. 1 and 2 of the drawings a simplified form of screw threading machine is illustrated, with the understanding that those skilled in the art will readily perceive the manner in which the invention may be applied to various known types of more complicated automatic machines, such as a multiple-spindle automatic screw machine. The machine herein shown comprises a chuck 2 adapted to be rotated by a belt-driven pulley 3 fixed to the chuck shaft 4 which is borne by standards 5 and 6 upon bed 7. In the chuck the work-piece W to be screw threaded is engaged and rotated. While in some cases a single rotary die or roll may be organized and operated to form the desired screw thread upon the work-piece, it is preferable, as shown herein, to provide two rolls or dies 8 and 9 so disposed and supported severally on spindles 10 and 11, journaled in a carriage 12, which is secured by screw 13 to a slide 14, that the shank of the work-piece W may be engaged between the circumferential thread-forming faces of the rolls with adequate thread-impressing pressure simply by moving the rolls laterally and in unison upon the work-piece. To such end the supporting slide 14 for the carriage 12 is mounted on a recessed slideway 15 on the bed 7 of the machine; a gear-rack 16 is formed on the bottom of the slide 14, and a pinion 17, positioned in the recess in the slideway and fixed to a shaft 18, meshes with the teeth of the rack; the shaft 18 is equipped with a hand lever 19 which may be manipulated to shift the carriage in a line that extends normal to the axis of the work-piece, and thereby move the thread-forming rolls into and out of engagement with the shank to be threaded. When the carriage is shifted to carry the rolls into thread-forming operation, the shank of the work-piece is received in the space between the rolls, as indicated at W in Fig. 2, and between the rotating rolls the shank is engaged and compressed to the extent required to sink the thread-forming ridges R on the rolls in the body of the shank, with such displacement or "flow" of metal in the surface region of the shank as to form a thread, as indicated at S in Fig. 1. When the thread has been formed the lever 19 is swung to retract the carriage and move the rolls away from the work-piece, whereupon the finished product may be removed from the chuck and a new work-piece inserted. Of course, if the machine is operated on the principle of an automatic screw machine, the shaft 4 of the chuck may be made hollow and a bar of stock may be advanced through the shaft and chuck, and caused to project from the chuck the proper interval for the thread-rolling operation, after which a cut-off tool may sever the threaded piece at the desired point between the thread and the chuck. Then, the finished threaded article having been thus cut from the stock, the chuck is released and the bar of stock is advanced an interval equal to the length of the article cut off. All of this practice is well known in the art and further detail is not required for an understanding of the present invention.

It will be understood that engagement of the thread-forming rolls with the positively rotated work-piece will in many cases be fully effective to impart the essential rotation to the rolls, and that it is desirable, if not necessary, to insure that both of the rolls shall rotate in unison. The latter result is obtained by means of an idler pinion 20, borne on a stud 21 on the carriage, and meshing with gears 22 and 23 severally fixed to the ends of the roll spindles 10 and 11 projecting from the opposite side of the carriage 12 from that on which the rolls 8 and 9 are mounted.

In those classes of threading operations in which inordinate and prohibitive slippage tends to occur between the work-piece and the rolls, I mechanically drive the rolls as well as the work-piece. I not only mechanically drive the rolls, but I provide mechanism connected to the chuck-rotating means for driving such rolls in absolute synchronism with the chuck which secures and rotates the work-piece. The mechanism, herein illustrated in exemplary way, comprises a closed mechanical gear train formed, in this case, of a counter-shaft 24 connected by gears 25 and 26 to rotate in unison with the chuck shaft 4, and through gears 27 and 28, a shaft 29, and a flexible coupling or wobbler 30, driving connection is made to one of the roll spindles, in this case to the spindle 10 of roll 8. Since the two spindles 10 and 11 are geared together (as at 20, 22 and 23) for rotation in unison, this positive drive of the spindle 10 provides positive rotation of both of the thread-forming rolls in synchronism with the work-rotating drive, and there can be no slippage between the shank of the work-piece and the faces of the thread-forming rolls. The flexible coupling 30 permits of the reciprocation of the entire threading unit on the slideway 15, without interrupting the driving connections.

Each roll 8 and 9 is adapted to shift axially to either side of the normal or thread-starting position of the roll. In this case each roll is secured rigidly on its rotating spindle, and each spindle is axially movable in its bearing in the carriage 12 to permit of the desired axial roll movement. Means are provided for shifting the spindles after a thread-rolling operation and restoring each roll to its normal position. Such means advantageously comprise a ridged collar or index roll 31 fixed on each of the roll spindles 10 and 11, and adapted to move axially with the spindles and with the thread-forming rolls secured thereto. Conveniently, the ridged collars 31 are formed integrally with the gears 22 and 23, respectively, and it is to be noted that the axial movement of each roll, spindle, collar and gear unit is within limits that do not allow disengagement of the gears 22 or 23 from the idler pinion 20. Cooperating with each ridged collar is a control wheel 32 including a V-groove in its periphery. Each control wheel 32 is freely rotatable on a "floating" journal 33 pivoted, as at 34, intermediate its ends to a rigid portion of the carriage, and a compressed spring 35 exerts thrust which yieldingly secures the grooved rim of the control wheel in engagement with the ridged collar on the associate roll spindle, such engagement normally serving to secure the spindle with its associate roll in normal or thread-starting axial position. However, when the rolls are pressed into thread-forming contact with the shank of a work-piece, and the rolls move axially in one direction or the other from normal position a resulting thrust is transmitted through the spindles 10 and 11 to the collars 31, and through such collars the thrust is transmitted to one inclined side face or the other of the V-shaped grooves in the control wheels 32 and effects the outward movement of the wheels against the yielding restraint of the springs 35. This mechanism readily yields to permit the desired axial movement of either or both rolls during a thread-forming operation. As soon as the ridges R on the thread-forming rolls have sunk into the substance of the work-piece and the thread is completely formed, the carriage 12 is retracted, removing the rolls from contact with the finished work-piece. As the rolls are removed from engagement with the formed threads the spring-backed control wheels 32 operate through the effect of the V-shaped grooves upon the ridged collars 31, to return the spindle and roll units to their normal axial positions. Such is the structure by virtue of which each roll is accurately restored and centered in its initial or thread-starting position, and by means of which the essential, substantially unrestrained axial movement of each roll is afforded.

Figure 5:
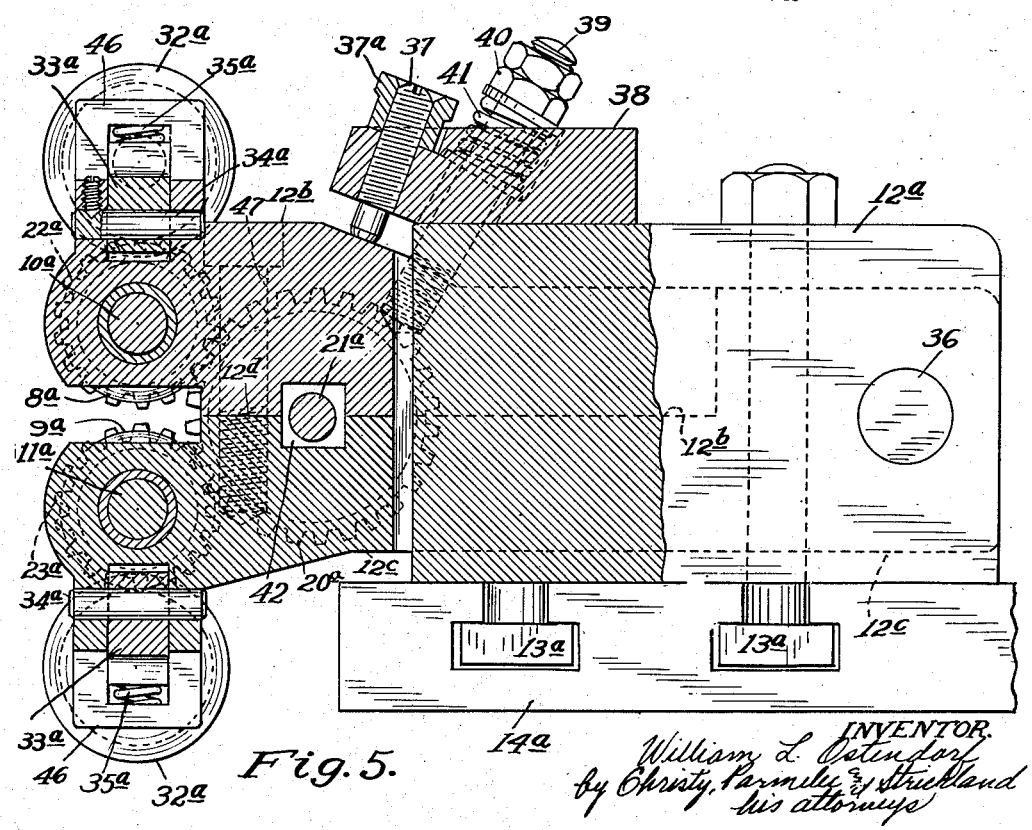
Fig. 5 is a view of the unit, partially in side elevation and partially in vertical section, on the plane V—V of Fig. 4, and showing fragmentarily a certain slide upon which the unit is mounted.

Referring to Figs. 3 to 5 a more refined structure of the thread-rolling unit is illustrated. The carriage, and by the term carriage I intend a supporting body for the thread-forming rolls, comprises a body 12a secured to a slide 14a, by means of bolts 13a, and such slide may be understood to be of suitable construction for mounting on the side tool slide of an automatic screw machine. The roll-supporting structure is formed in two parts 12b and 12c, and the part 12c is positioned against one side of body 12a and is pivoted on a pintle 36 to such body 12a, while the part 12b seats in a recess in part 12c, as appears in dotted lines in Fig. 5. The spindle 10a, roll 8a, gear 22a and ridged collar 31a are carried by the part 12b, while the roll 9a and its spindle and associate elements are carried by the part 12c. The two parts 12b and 12c meet in the plane 12d (Figs. 3 and 5), and are secured in assembly by means of a dowel 48 and threaded locking means in the form of three screws 47 (Fig. 4). With the two roll-supporting parts thus rigidly secured in assembly, the space between the working faces of the rolls is fixed. However, if it be desirable to increase the space between the rolls without substituting smaller rolls, it is possible to loosen the screws 47, and insert shims (not shown) between the meeting faces of the parts 12b and 12c, whereby, when the screws 47 are retightened, the desired increased space between the rolls is established.

The cylindrical stud or spindle 21a, on which the pinion 20a is idly mounted to mesh with gears 22a and 23a on the roll spindles, extends through a square-sectioned bore 42 (Fig. 5) formed within the meeting faces of the two carriage parts 12b and 12c. The spindle 21a is of smaller cross section than the bore, whereby the spindle may be laterally adjusted in the bore to obtain proper engagement of the pinion 20a with each of the gears 22a and 23a. The spindle is provided with an integral collar 43 (Fig. 4) which is drawn tightly against one side of the united parts 12b and 12c, by means of a nut 44 threaded to the spindle on the opposite side of the carriage. The spindle is thus secured in laterally adjusted position.

A stud 39 is secured in carriage part 12b, and extends slidably through an orifice in a bracket 38 rigid with the carriage body portion 12a. Between a nut 40 on the outer end of this stud and the body of the bracket 38 a compressed coil spring 41 is disposed, and this spring tends to draw the stud 39 upward through the bracket (Fig. 5) and to turn the united roll-supporting parts 12b and 12c clockwise on the pintle 36. Resisting this effect of the spring 41 is a stop screw 37, threaded in the bracket 38, and extending therefrom into abutment upon the top of part 12b. By turning the screw in one direction or the other, it is manifest that the united roll support 12b, 12c may be moved either clockwise or counterclockwise on the pintle 36, whereby the elevation of the rolls 8a and 9a with respect to the line of reciprocation of the roll carriage relative to the work-piece in a threading or screw machine may be adjusted, to the end that the work-piece will be centered with the space between the rolls that are closed upon it during a threading operation.

As in the case of the structure of Figs 1 and 2, a grooved control roll or wheel, mounted on a floating journal, engages the ridged collar on each roll spindle. The floating journal for each control wheel 32a comprises an arm 33a pivoted, at 34a, to the carriage body, and on the distal end of such arm a journal in the form of a ball bearing 45 rotatably supports the wheel 32a. A spring 35a is compressed between the arm 33a and an abutment 46 rigidly secured to the carriage body. The effect of this spring is to secure the grooved rim of wheel 32a in engagement with the ridged collar 31a on the roll spindle with which it is associated. The two control wheels 32a yield to permit the substantially free axial movement of the rolls to either side of their normal position during a thread-forming operation, and upon the completion of such operation cooperate with the two collars 31a to restore the thread-forming rolls to their starting position, in precisely the manner that their counterparts function in the structure of Figs 1 and 2.

The ridged collars 31a are shown to be in fixed axial position on the spindles 10a and 11a, but it will be understood that the engagement of each collar 31a with its spindle may be a threaded engagement that permits intentional adjustment of the collar in its otherwise fixed position on the spindle, in order to synchronize the two thread-forming rolls in their normal position.

The structure of Figs. 3 to 5 has been operated with outstanding success in automatic screw machines, and in the type of threading of small diameter brass stock which I performed the positive driving of the rolls was not required. However, in the case of larger stock and other metals or materials, the positive driving of the rolls in synchronism with the work may be practiced in the manner described in the structure of Figs. 1 and 2; it being manifest from what has been said that one of the spindles 10a or 11a may, at the end remote from the roll (8a or 9a), be fashioned to engage a suitable driving connection, such as the coupling or wobbler shown at 30 in Fig. 1.

Figure 6:
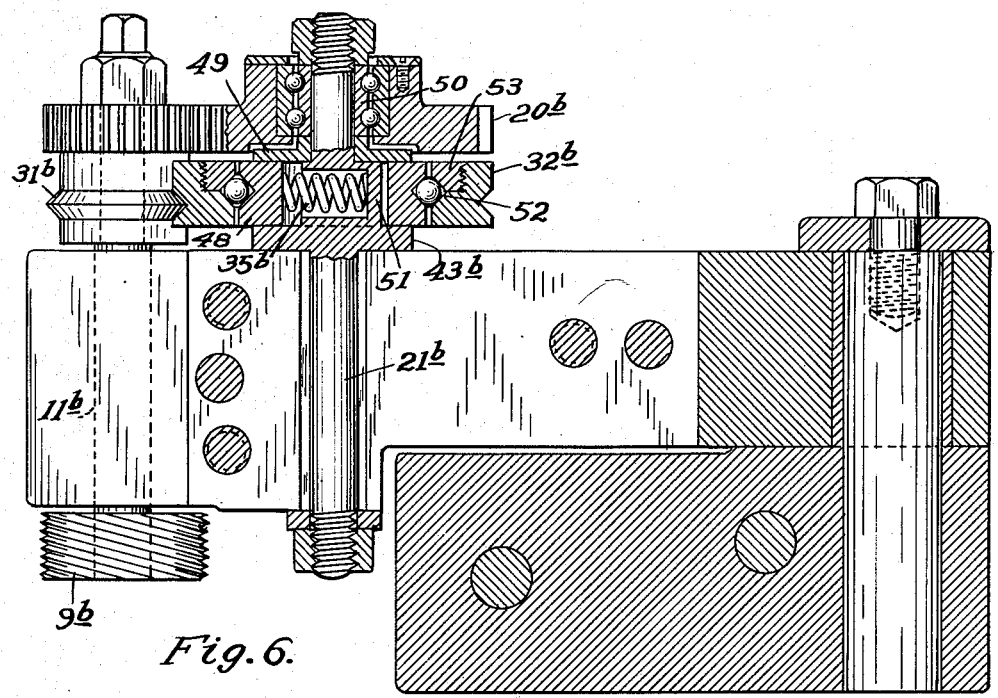
Fig. 6 is a view of the unit embodying certain modifications in construction, the view being in horizontal section, on the plane VI—VI of Fig. 7.
Figure 7:
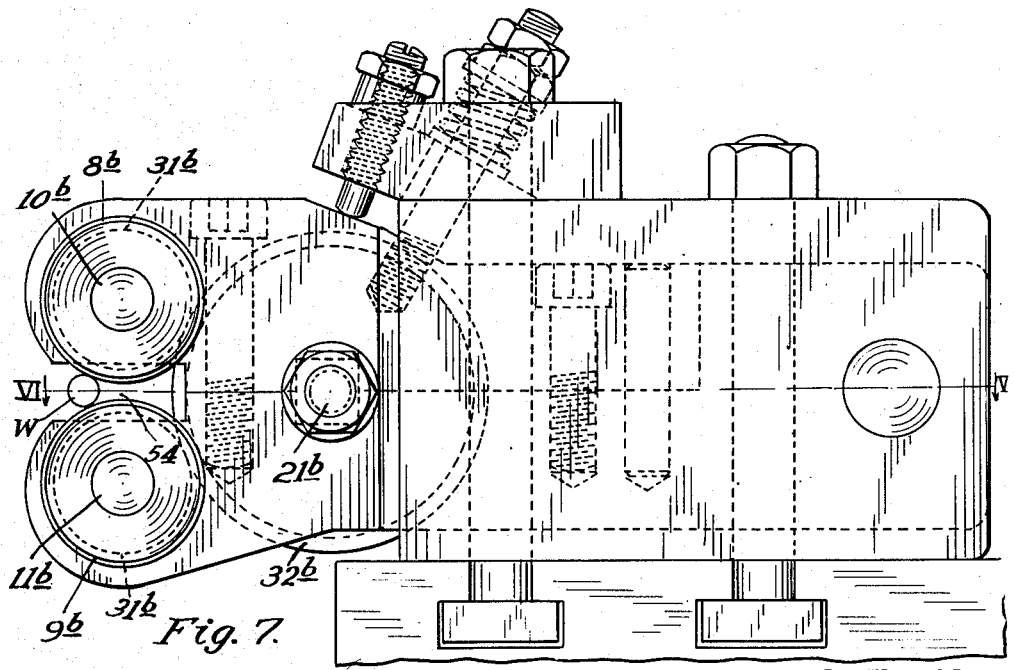
Fig. 7 is a view in side elevation of the modified structure of Fig. 6, showing the supporting slide fragmentarily.

Figs. 6 and 7 illustrate a modification in the means which cooperate with the ridged collars 31b on the spindles 10b and 11b to control the position of the thread-forming rolls. In other respects the structure of Figs. 6 and 7 is substantially the same as that of Figs. 3 to 5.

Whereas the thread-rolling device of Figs. 3 to 5 (and of Figs. 1 and 2 too), provides an individual grooved wheel for the ridged collar of each roll spindle, in the modified structure of Figs. 6 and 7, a single large grooved wheel 32b engages the ridged collars on both of the roll spindles, and performs the intended function. Advantageously, this double-acting wheel 32b is mounted on the same laterally adjustable spindle 21b that carries the idler pinion 29b which meshes with the gears on the roll spindles, and the essential floating journal of the wheel 32b comprises an annulus 48. The annulus 48 forms in its peripheral edge the inner raceway for a race of ball-bearings 52, while the grooved rim of the wheel 32b provides a freely rotatable outer raceway for the ball bearings, the grooved rim of the wheel including a threaded insert ring 53 to permit the assembly of the rim on the race of ball bearings. The annulus 48 is secured between a collar portion 43b on spindle 21b and a keeper disk 49, held in place by the inner race member 50 of the anti-friction bearing of the pinion 20b. On the body of the spindle 21b a socketed portion 51 is formed, it being noted that the central opening in the annulus is larger than the socketed portion 51, whereby the annulus and the freely rotatable grooved rim borne thereby may, while being axially confined by elements 43b and 49, move to and fro in a direction normal to the axis of the spindle 21b. A spring 35b is positioned in the socket portion 51, and this spring, projecting from the socket, bears against the annulus, and yieldingly secures the grooved rim of the assembled wheel 32b in engagement with the ridged collars 31b on both of the roll spindles 10b and 11b, as may be understood upon viewing Fig. 7. The single grooved wheel, as thus mounted and as thus organized with spring 35b, is effective to effect the intended, and only the intended, axial movements of the thread-forming rolls 8b and 9b. It remains to be noted that the socketed portion 51 may be flat sided, with central opening in the annulus 48 correspondingly shaped, so that the only lateral movement of the assembled wheel 32b will be in the direction of the axis of the coiled spring 35b, that is, on a line extending radially from the axis of spindle 21b through the center of the space 54 (Fig. 7) between the ridged collars 31b on the roll spindles 10b and 11b. The so-constituted structure is effective for the purposes described.

As already indicated the structure of this invention has been proved in commercial production. For example, in a production run on brass work-pieces, $\frac{3}{16}''$ in diameter, over one million pieces have been threaded with the same set of thread-forming rolls; and the time required in the automatic screw machine for the thread-forming operation was reduced to $\frac{4}{10}$ of a second. The threads thus formed are of superior quality, and untold life remains in the rolls for continued production.

The outstanding success of the unit of this invention is attributed to the adaptability of the control rolls (32a) to allow substantially unrestrained or free axial movement of the thread-forming rolls in either direction required from normal position, plus the capacity of such control rolls for positively restoring the thread-forming rolls to normal position after each thread is formed.

Threads can be rolled on steel work-pieces, brass or aluminum with the same unit, even though the different materials will affect the degree of slippage between the work and the threading rolls. Another advantage is that the unit permits the rolling of accurate threads on work-pieces which are either slightly smaller or larger than the diameter for which the unit is designed.

It is to be noted that the two thread-forming rolls in the unit straddle the work-piece, and each roll attacks the surface of the work-piece tangentially on opposite sides, thereby eliminating distorting lateral pressure upon the work-piece and minimizing angular stress upon spindle bearings of the screw machine.

A unit having two cooperating thread-forming rolls as described in the foregoing specification is particularly desirable for producing extremely accurate threads of Class Four limits. However, in cases where the work is not held to close diameter tolerances, and the work-piece is strong enough to resist lateral deflection, a unit including a single thread-forming roll mounted in a structural organization, such as that described, may be used with advantage. Thus, it will be understood that the features of this invention may be applied to thread-rolling units having a single thread-forming roll, and possibly in units having more than two rolls.

Within the terms of the appended claims, these and other variations and modifications are held in contemplation.

I claim:

1. Thread-rolling apparatus comprising a support, two spindles journaled in said support for axial and rotary movements, a thread-forming roll secured to one end of each spindle, a ridged collar and a gear secured on the opposite end of each spindle, a pinion interconnecting the gears of the several spindles, two floating journals pivotally mounted on said support, a grooved wheel on each of said journals, springs acting on said journals yieldingly to secure the grooved rims of said wheels severally in engagement with the ridges of said collars.

2. Thread-rolling apparatus comprising support means, a plurality of spindles borne by said support means, a rotary thread-forming roll mounted on each spindle and arranged for axial movement from normal position during the engagement of the roll with a rotating work-piece, a ridged collar for each roll mounted for common axial movement with the roll, a rotary grooved wheel mounted on a floating journal in position for its groove to engage a plurality of said ridged collars, yielding means urging the grooved wheel to maintain said engagement of its groove with said collars, whereby the rolls are restored to normal position when they are disengaged from the work-piece.

3. In the structure of claim 2, a gear connected to each thread-forming roll, and a pinion mounted on common axis with said grooved wheel and meshing with the several gears connected to said rolls.

4. Thread-rolling apparatus comprising a support, two spindles journaled in said support for axial and rotary movements, a thread-forming roll secured to one end of each spindle, a ridged collar and a gear secured on the opposite end of each spindle, a pinion interconnecting the gears of the several spindles, two journals movably mounted on said support, a grooved wheel rotatable on each of said journals with the grooved rims of the wheels severally aligned with the ridges of said collars, and springs acting on said movable journals to secure said grooved rims of the wheels in yielding engagement with the ridges of said collars.

5. Thread-rolling apparatus comprising a support, a spindle journaled in said support for axial and rotary movements, a thread-forming roll secured to said spindle, a ridged collar secured to said spindle in fixed axial relation with respect to said roll, a journal mounted in said support for movement laterally of the journal axis, a grooved wheel on said journal arranged with its grooved rim in engagement with the ridge of said collar, and a spring acting on said journal to secure said grooved rim in yielding engagement with the ridge of said collar.

WILLIAM L. OSTENDORF.

REFERENCES CITED

The following references are of record in the file of this patent:

UNITED STATES PATENTS

| Number | Name | Date |
|---|---|---|
| 568,594 | Zolot | Sept. 29, 1896 |
| 1,010,740 | Douglas | Dec. 5, 1911 |
| 1,083,598 | Douglas | Jan. 6, 1914 |
| 2,054,182 | Unke | Sept. 15, 1936 |
| 2,204,182 | Gould | June 11, 1940 |
| 2,218,574 | Gould | Oct. 22, 1940 |